United States Patent
Wang

(10) Patent No.: US 11,846,751 B1
(45) Date of Patent: Dec. 19, 2023

(54) LIGHT EMITTED FROM DECORATIVE COVER

(71) Applicant: Tiejun Wang, Lin'an (CN)

(72) Inventor: Tiejun Wang, Lin'an (CN)

( * ) Notice: Subject to any disclaimer, the term of this patent is extended or adjusted under 35 U.S.C. 154(b) by 0 days.

(21) Appl. No.: 17/992,607

(22) Filed: Nov. 22, 2022

(51) Int. Cl.
*F21V 8/00* (2006.01)

(52) U.S. Cl.
CPC ......... *G02B 6/0043* (2013.01); *G02B 6/0045* (2013.01)

(58) Field of Classification Search
None
See application file for complete search history.

(56) References Cited

U.S. PATENT DOCUMENTS

| | | | | |
|---|---|---|---|---|
| 5,057,974 | A * | 10/1991 | Mizobe | G02B 6/0065 362/23.15 |
| 5,397,867 | A * | 3/1995 | Demeo | G02B 6/0043 200/314 |
| 2014/0211508 | A1 * | 7/2014 | Yuan | G02B 6/0031 385/88 |
| 2015/0023024 | A1 * | 1/2015 | Ohta | H10K 50/856 362/296.01 |
| 2018/0031752 | A1 * | 2/2018 | Ferrini | G02B 6/0023 |
| 2018/0239076 | A1 * | 8/2018 | Chen | G02B 6/0068 |
| 2021/0223455 | A1 * | 7/2021 | Tan | G02F 1/133615 |

\* cited by examiner

*Primary Examiner* — Fatima N Farokhrooz
(74) *Attorney, Agent, or Firm* — Daniel M. Cohn; Howard M. Cohn

(57) ABSTRACT

A disk of transparent material having a bottom surface that is smooth and flat. The disk has a top surface that is parallel with the bottom surface and has four regions. The first region is disk-shaped and frosted, the second region surrounds the first region and comprises a smooth and flat surface interrupted by an array of dots. The third region surrounds the second region and is smooth and flat. The fourth region surrounds the third region and is beveled so as to be sloped downward, from the third region toward the bottom, to form a beveled edge.

17 Claims, 5 Drawing Sheets

US 11,846,751 B1

LIGHT EMITTED FROM DECORATIVE COVER

TECHNICAL FIELD

Embodiments of the technology relate generally to lighting systems and more specifically to lighting systems that can be readily configured to produce illumination of different color temperatures.

BACKGROUND

For illumination applications, light emitting diodes (LEDs) offer substantial potential benefit associated with their energy efficiency, light quality, and compact size. However, to realize the full potential benefits offered by light emitting diodes, new technologies are needed.

With luminaires that incorporate incandescent or fluorescent technology, some flexibility can be obtained by swapping lamps to meet user preferences. In such luminaires, lamp selection can provide flexibility in terms of correlated color temperature (CCT or color temperature) and light output (lumen output). For example, a compact fluorescent downlight might accept 6-watt, 32-watt, and 42 watt lamps in 2700, 3000, and 3500 K CCT. Additionally, changing lamp position and focal point in a reflector of an incandescent or fluorescent fixture can change the fixture spacing criteria (SC) of a luminaire.

In contrast, conventional light-emitting-diode (LED) based luminaires typically offer reduced flexibility when the luminaire's LED based light source is permanently attached to the luminaire. Stocking conventional LED based luminaires at distribution to accommodate multiple configurations that users may desire can entail maintaining a relatively large or cumbersome inventory.

Need is apparent for a technology to provide a light emitting diode system that can adapt to various applications, for example by delivering multiple color temperatures, multiple lumens, and/or multiple photometric distributions. Need further exists for a capability to enable a single luminaire to be stocked at distribution and then quickly configured according to application parameters and deployment dictates. Need further exists for luminaires that are both energy efficient and flexible. A capability addressing one or more such needs, or some other related deficiency in the art, would support improved illumination systems more widespread utilization of light emitting diodes lighting applications.

SUMMARY OF THE INVENTION

In accordance with the present invention, a disk of transparent material has a bottom surface that is smooth and flat. The disk has a top surface that is parallel with the bottom surface and has four regions. The first region is disk-shaped and frosted, the second region surrounds the first region and comprises a smooth and flat surface interrupted by an array of dots. The third region surrounds the second region and is smooth and flat. The fourth region surrounds the third region and is beveled so as to be sloped downward, from the third region toward the bottom, to form a beveled edge.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting.

Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

Figure 1:
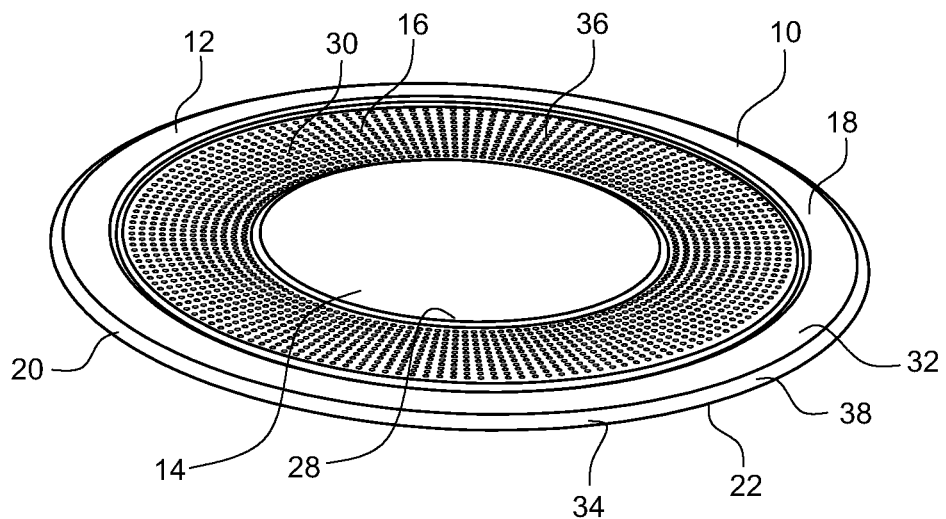

In some cases, similar elements may be referred to by similar numbers in various figures (FIGs) of the drawing, in which case typically the last two significant digits may be the same, the most significant digit being the number of the drawing figure (FIG). Furthermore, for clarity, some reference numbers may be omitted in certain drawings.

FIG. 1 is a three-dimensional view of a transparent light fixture having an upper surface with (i) a flat radially-inner disk-shaped portion that is frosted and, and ii) an intermediate ring-shaped portion that surrounds the radially-inner disk-shaped portion and has a prismatically-patterned light-diffusing contour, and (iii) an outer ring-shaped portion that surrounds the intermediate ring-shaped portion.

Figure 2:
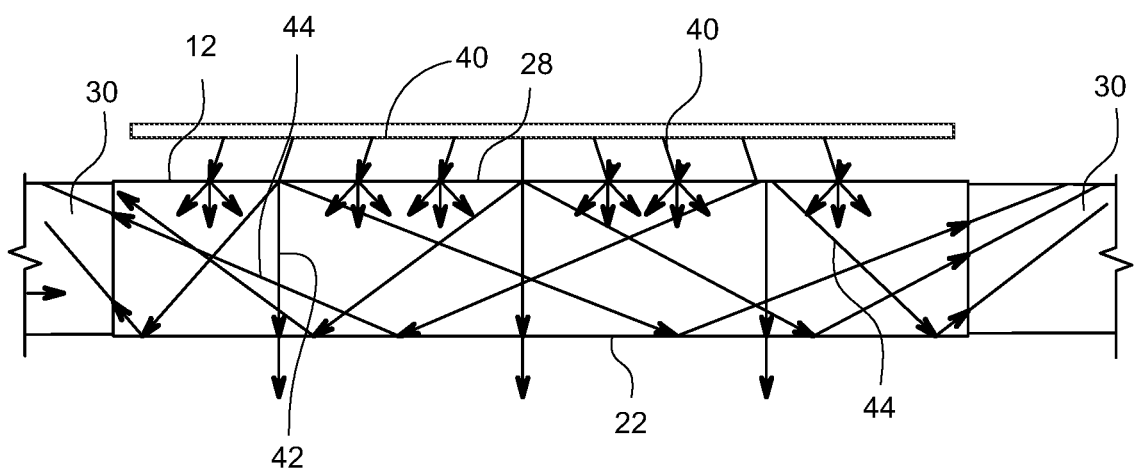

FIG. 2 is cross sectional view of the transparent light fixture showing the light being transmitted through the radially-inner disk-shaped portion of the transparent light fixture that is frosted and flat, according to the present invention.

Figure 3:
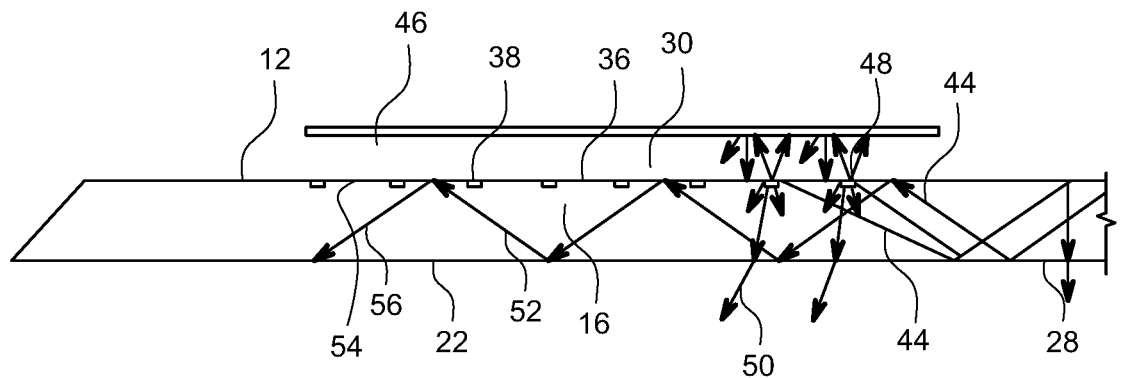

FIG. 3 is three dimensional view of the transparent light fixture showing the light being transmitted through the intermediate ring-shaped portion that surrounds the radially-inner disk-shaped portion and has a prismatically-patterned light-diffusing contour, according to the present invention.

Figure 4:
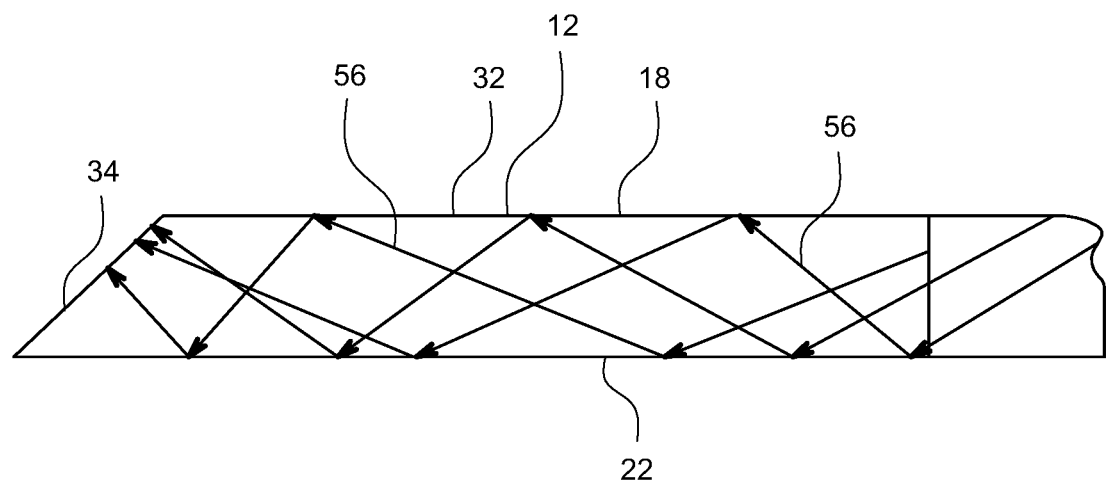

FIG. 4 is cross sectional view of the transparent light fixture showing the light being transmitted through the intermediate ring-shaped portion that surrounds the radially-inner disk-shaped portion and has a prismatically-patterned light-diffusing contour, according to the present invention.

Figure 5:
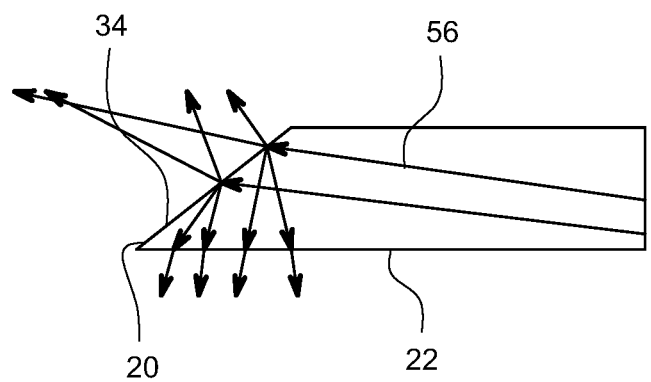

FIG. 5 is three dimensional view of the transparent light fixture showing the light being transmitted through the outer ring-shaped portion that surrounds the intermediate ring-shaped portion, according to the present invention.

Figure 6:
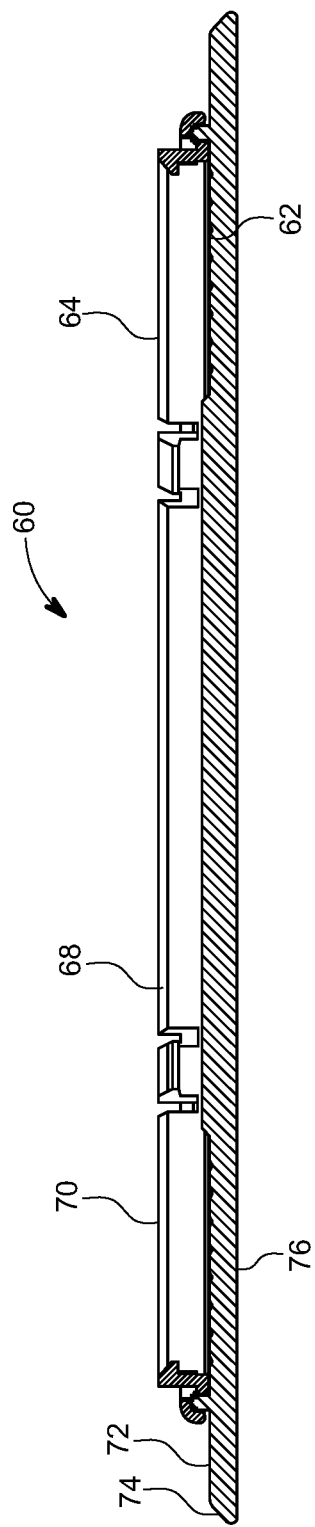

FIG. 6 is cross sectional view of the transparent light fixture showing the mounting of a luminous surface ring to amounting base, according to the present invention.

Figure 7:
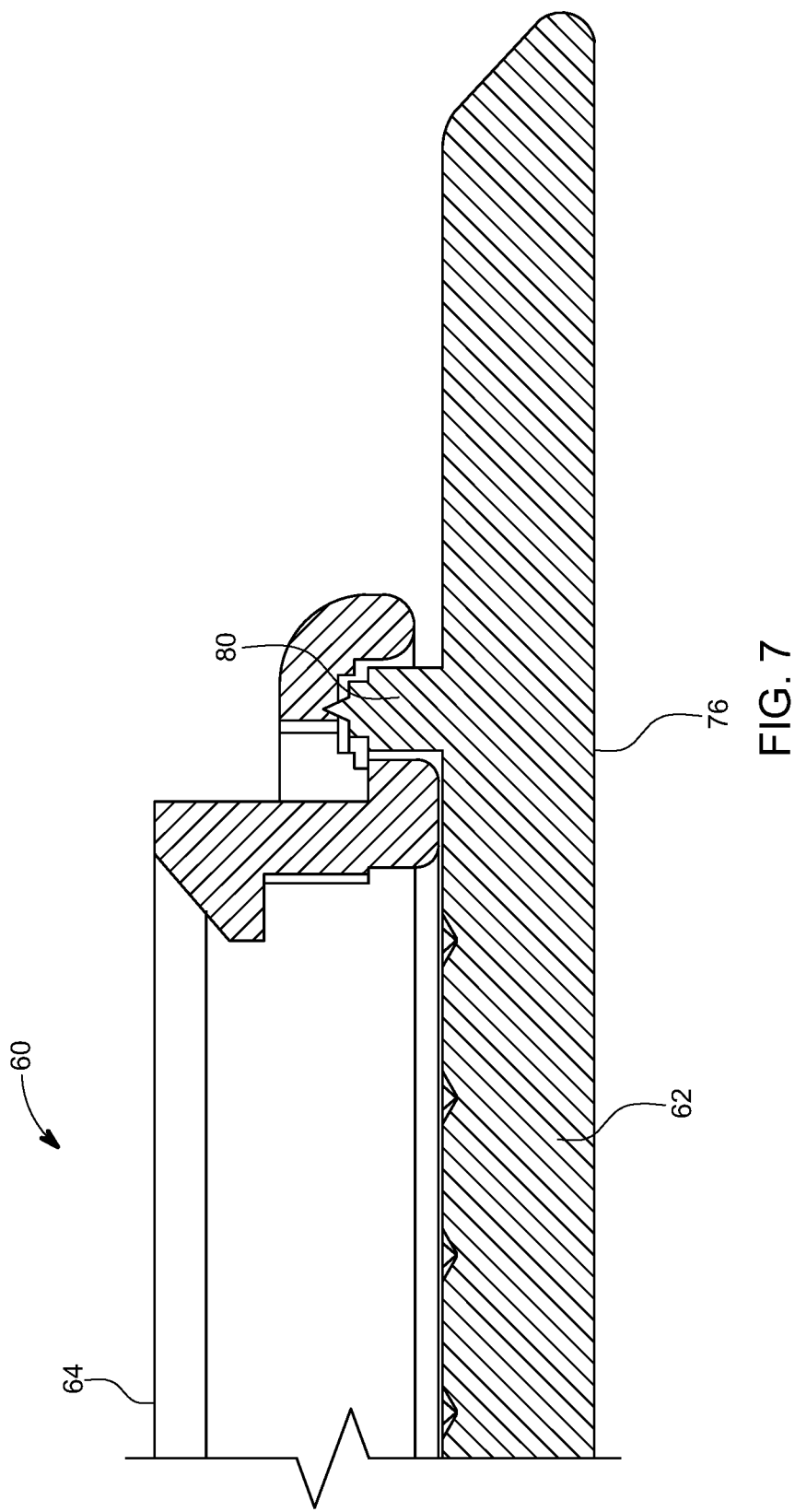

FIG. 7 is cross sectional view of the installation buckle on the installation base, according to the present invention.

Figure 8:
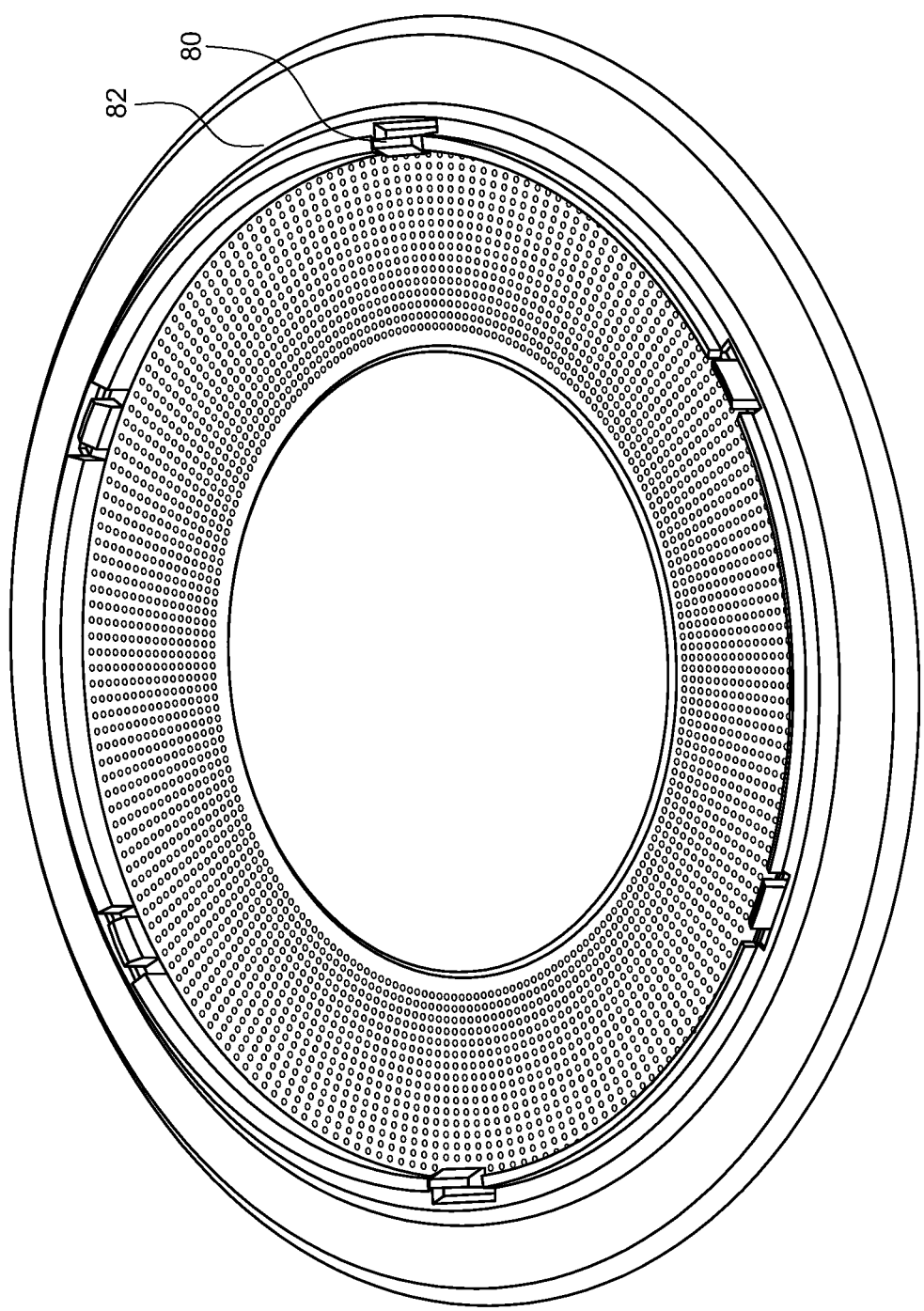

FIG. 8 is three dimensional view of the snap mounted to the base to be directly clamped to a thin downlight, according to the present invention.

DETAILED DESCRIPTION

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader and should not in any way be interpreted as limiting.

Referring to FIG. 1, there is shown a three-dimensional view of a transparent light fixture 10 having an upper surface 12 with (i) a flat, radially-inner disk-shaped portion 14 that is frosted and, and ii) an intermediate ring-shaped portion 16 that surrounds the radially-inner disk-shaped portion and has a prismatically-patterned light-diffusing contour. An outer ring-shaped portion 18 surrounds the intermediate ring-shaped portion 16. The outer ring-shaped portion 18 has a frosted outer edge surface 20. The transparent light fixture 10 has a bottom surface 22 that is smooth and flat.

The top or upper surface 12 is parallel with the bottom surface 22 and has four regions 26. The four regions 26 comprise a first region 28 that corresponds to the flat, radially-inner disk-shaped portion 14. A second region 30 corresponds to the intermediate ring-shaped portion 16. A third region 32 corresponds to the outer ring-shaped portion 18 and a fourth region 34 corresponds to the frosted outer edge surface 20.

The first region 28 is disk-shaped and frosted. The second region 30 surrounds the first region 28 and comprises a smooth and flat surface 36 interrupted by an array of dots 38. The third region 32 is a ring-shaped portion that surrounds the second region 30 and is smooth and flat. The fourth region 34 is an outer ring-shaped, frosted outer edge surface 20 that surrounds the third region 32 and is beveled so as to be sloped downward, from the third region toward the bottom surface 22, to form the beveled edge 38.

The incident surface 28 of the transparent light fixture 10 is frosted so that the light is Gaussian and evenly scattered. The scattered light passes through the light emitting surface 22 which is a smooth plane. According to the law of refraction, when the light is from a dense medium to a light sparse medium, if the incident light is greater than the critical angle, the light is totally reflected. Thus, the light emitted by the downlight, in the transparent light fixture 10, most of the light is emitted in the vertical direction and a small part emits light in the horizontal direction as shown in FIG. 2.

The frosted first region 28 is located below a source of light rays 40 of light that project downward, as shown in FIG. 2, to impinge on the frosted first region such that the first rays 42 that travel downward through the first region 28 at an incidence angle that is greater than the material's critical angle and are therefore transmitted downward through the bottom surface 22 of the frosted first region 28.

The second rays 44, created by the light rays 40, travel below the first region 28 at an incidence angle that is less than the material's critical angle and are therefore internally reflected back-and-forth between the top and bottom surfaces 12 and 22, respectively, as the second rays 44 progress toward the third region 32.

At the second region 30, some of the second rays 44 from the first region, as shown in FIG. 3, impinge on the light guide dots 38 disposed on the surface of the second region, and are scattered by the dots to form third rays 48 directed upward toward the reflective surface 46. This light emitted from the light fixture 10 can be seen by an observer. Part of the light does not pass through the light guide dot and continues to propagate through total reflection.

Fourth rays 50 are directed downward from the dots 38 at an angle that is higher than the critical angle and are therefore transmitted downward through the bottom surface 22 below the intermediate ring-shaped portion 16.

Fifth rays 52, as shown in FIG. 3, are directed downward from the smooth, top surface 54 between dots 38 at an angle that is lower than the material's critical angle and are therefore internally reflected back-and-forth between the top and bottom surfaces 12 and 22 as the fifth rays 52 progress toward the smooth and flat, ring-shaped third region 32. The third region 32 is a ring-shaped portion that surrounds the second region 30.

As shown in FIG. 3, others of the second rays 44 impinge on the smooth top surface 54 between the dots and internally reflected as sixth rays 56 back-and-forth between the top and bottom surfaces 12 and 22 as the sixth rays progress toward the fourth region 34.

At the third region 32, as shown in FIG. 4, the sixth rays 56 are internally reflected back-and-forth between the top and bottom surfaces 12 and 22 as the sixth rays progress toward the fourth region 34. Because the upper and lower surfaces 12 and 22 of this part of the fixture are smooth surfaces, the light is fully reflected here and no light is irradiated from the top or bottom surface of fixture 10.

At the fourth region 34, as shown in FIG. 5, the sixth rays 56 impinge on the fourth region to be internally reflected, from the fourth region, downward toward and through the bottom surface. Here, the light enters the side of the fixture and the side is treated with frosted surface. The light becomes Gaussian scattering, and part of the light exits the fixture to illuminate the ceiling. When part of the light is illuminated, the human eye receives the light, and the visual effect is bright, such as an aperture.

After the light is emitted from a downlight diffuser, it enters the transparent light fixture 10. The light can be directed from the downlight diffuser to the upper surface 12 the light fixture 10 from various sources such as, for example, an array of LEDs (not shown).

As shown in FIG. 2, light is directed through the flat, radially-inner disk-shaped portion 14 of the transparent light fixture 10. The disk-shaped portion 14 has a frosted upper surface 28 which causes scattered rays of light 30 to pass downward through the light emitting surface 32, which is a smooth flat plane. The light rays 30 which diverge less than the critical angle form the light entry surface 28 pass downward through the light emitting surface 32. By contrast, the light rays 30 which diverge more than the critical angle, i.e. closer to horizontal, reflect up from the light emitting surface 32 towards the light entry surface 28 as the rays travel through the disk-shaped portion 14 to the outer edges 20 of the transparent light fixture 10. In other words, the light rays 30 are internally reflected in the transparent light fixture 10 until they reach the outer edges 20 of the transparent light fixture from which they can escape. Thus, for the light emitted by the downlight in the decorative cover, most of the light rays are emitted in the vertical direction and a small amount of light is emitted in the horizontal direction.

As shown in FIG. 3, light rays 30 travelling from the disk-shaped portion 14 to the outer edges 20 of the transparent light fixture 10 crosses through the intermediate ring-shaped portion 16 with a prismatically-patterned light-diffusing contour that surrounds the disk-shaped portion 14 is internally reflected when the rays hit between the dots. However, when the rays hit the dots 34, the rays pass downward through the light emitting surface 32, which is a smooth flat plane.

The light rays from the downlight's light emitting surface is directed at the light guidedot surface 38. If the light meets the light guide dot 34, the light rays 36 are scattered and the scattered light is directly emitted and reflected through the rear lamp body 40. The part of the light that does not meet the light guide dots 34 continues to propagate through internal reflection through the disk-shaped portion 14 to the outer edges 20 of the transparent light fixture 10.

As shown in FIG. 6, transparent light fixture 60 is constructed of a mounting base 62 and a surface ring 64. The surface ring 64 has an upper surface 66 with a flat, radially-inner disk-shaped portion 68 that is frosted and an intermediate ring-shaped portion 70 that surrounds the radially-inner disk-shaped portion and has a prismatically-patterned light-diffusing contour. An outer ring-shaped portion 72 surrounds the intermediate ring-shaped portion 70. The outer ring-shaped portion 72 has a frosted outer edge surface 74. The transparent light fixture 60 has a bottom surface 76 that is smooth and flat.

Referring to FIG. 7, an ultra-thin downlight installation buckle 80 is made on the mounting base 62. An ultrasonic line is made on the luminous decorative surface ring 82. The two parts are welded and bonded by the ultrasonic generator, which can achieve the advantages of no mold parting line, uniform luminous spot, convenient installation and so on.

Referring to FIG. 8, the snap 80 in the base can be used to install the luminous decorative surface ring 82 which can be directly clamped to the ultra-thin downlight. The decorative surface ring has no influence of mold parting line, and the light guide dot of the decorative surface ring is uniform and has a large area.

It is to be understood that the above-described embodiments of the present invention are merely illustrative of or explaining the principles of the invention and are not to be construed as limiting the invention. Therefore, any modification, equivalent replacement, improvement and the like made without departing from the spirit and scope of the present invention should be included in the protection scope of the present invention. Further, it is intended that the appended claims cover all such variations and modifications as fall within the scope and boundaries of the appended claims or the equivalents of such scope and boundaries,

The invention claimed is:

1. A disk of transparent material, the disk having:
   a bottom surface that is smooth and flat;
   a top surface that is parallel with the bottom surface and has four regions comprising:
   a first region that is disk-shaped and frosted and located below a source of rays of light that project downward to impinge on the first region;
   a second region that surrounds the first region and comprises a smooth and flat surface interrupted by an array of dots, the second region located below a reflective surface;
   a third region that surrounds the second region and is smooth and flat; and
   a fourth region that surrounds the third region and is beveled so as to be sloped downward, from the third region toward the bottom surface, to form a beveled edge.

2. The disk of transparent material of claim 1 wherein, at the first region, the impinging rays are scattered by the frosted first region into:
   first rays that travel downward through the first region at an incidence angle that is greater than the material's critical angle and are therefore transmitted downward through the bottom surface; and
   second rays that travel below the first region at an incidence angle that is less than the material's critical angle and are therefore internally reflected back-and-forth between the top and bottom surfaces as the second rays progress toward the third region.

3. The disk of transparent material of claim 2 wherein, at the second region, some of the second rays impinge on the dots of the second region and are scattered by the dots.

4. The disk of transparent material of claim 3 wherein, at the second region third rays are directed upward from the top surface of the disk toward the reflective surface.

5. The disk of transparent material of claim 4 wherein, fourth rays are directed downward from the dots on the second region of the disk at an angle that is higher than the critical angle and are therefore transmitted downward through the bottom surface of the disk.

6. The disk of transparent material of claim 5 wherein, fifth rays directed downward from the dots on the second region of the disk at an angle that is lower than the material's critical angle and are therefore internally reflected back-and-forth between the top and bottom surfaces of the disk as the fifth rays progress toward the third region.

7. The disk of transparent material of claim 6 wherein, others of the second rays impinge on the smooth top surface on the second region of the disk between the dots to be to be internally reflected as sixth rays back-and-forth between the top and bottom surfaces of the disk as the sixth rays progress toward the fourth region.

8. The disk of transparent material of claim 7 wherein, at the third region, the fifth and sixth rays are internally reflected back-and-forth between the top and bottom surfaces of the disk as the fifth and sixth rays progress toward the fourth region.

9. The disk of transparent material of claim 8 wherein, at the fourth region, the fifth and six rays impinge on the fourth region to be internally reflected, from the fourth region, downward toward and through the bottom surface of the disk.

10. A disk of transparent material, the disk having:
    a bottom surface that is smooth and flat;
    a top surface that is parallel with the bottom surface and has four regions comprising: the first region being located below a source of rays of light that project downward to impinge on the first region;
    a first region that is disk-shaped and frosted; at the first region, the impinging rays are scattered by the frosted first region into:
    first rays that travel downward through the first region at an incidence angle that is greater than the material's critical angle and are therefore transmitted downward through the bottom surface; and
    second rays that travel below the first region at an incidence angle that is less than the material's critical angle and are therefore internally reflected back-and-forth between the top and bottom surfaces as the second rays progress toward a third region;
    a second region that surrounds the first region and comprises a smooth and flat surface interrupted by an array of dots, the second region located below a reflective surface;
    the third region that surrounds the second region and is smooth and flat; and
    a fourth region that surrounds the third region and is beveled so as to be sloped downward, from the third region toward the bottom, to form a beveled edge.

11. The disk of transparent material of claim 10 wherein, at the second region, some of the second rays impinge on the dots of the second region and are scattered by the dots.

12. The disk of transparent material of claim 11 wherein, at the second region third rays are directed upward from the top surface of the disk toward the reflective surface.

13. The disk of transparent material of claim 12 wherein, fourth rays are directed downward from dots on the second region of the disk at the dots at an angle that is higher than the critical angle and are therefore transmitted downward through the bottom surface.

14. The disk of transparent material of claim 13 wherein, fifth rays directed downward from the dots at an angle that is lower than the material's critical angle and are therefore internally reflected back-and-forth between the top and bottom surfaces as the second downward rays progress toward the third region.

15. The disk of transparent material of claim 14 wherein, others of the second rays impinge on the smooth top surface of the disk between the dots to be internally reflected as sixth rays back-and-forth between the top and bottom surfaces of the disk as the sixth rays progress toward the fourth region.

16. The disk of transparent material of claim 15 wherein, at the third region, the fifth and sixth rays are internally reflected back-and-forth between the top and bottom surfaces of the disk as the fifth and sixth rays progress toward the fourth region.

17. The disk of transparent material of claim 16 wherein, at the fourth region, the fifth and six rays impinge on the fourth region to be internally reflected, from the fourth region, downward toward and through the bottom surface of the disk.

\* \* \* \* \*